(12) United States Patent
Walker et al.

(10) Patent No.: US 6,725,292 B2
(45) Date of Patent: Apr. 20, 2004

(54) DIRECT MEMORY ACCESS CONTROLLER FOR CIRCULAR BUFFERS

(75) Inventors: Anthony Mark Walker, Plymouth (GB); Matthew Charles Buckley, Tavistock (GB); Maison Lloyd Worroll, Plymouth (GB); Jonathan Evered, Plymouth (GB); Daniel Fisher, Plymouth (GB); David Aldridge, Tavistock (GB); Andrew Watkins, Swindon (GB)

(73) Assignee: Zarlink Semiconductor Limited (GB)

( * ) Notice: Subject to any disclaimer, the term of this patent is extended or adjusted under 35 U.S.C. 154(b) by 98 days.

(21) Appl. No.: 10/056,859

(22) Filed: Jan. 25, 2002

(65) Prior Publication Data

US 2003/0007396 A1 Jan. 9, 2003

(30) Foreign Application Priority Data

Jan. 27, 2001 (GB) .............................. 0102173

(51) Int. Cl.$^7$ .............................................. G06F 13/28
(52) U.S. Cl. ............................. 710/22; 710/52; 711/110
(58) Field of Search ............................. 710/22, 52, 28, 710/29; 711/110

(56) References Cited

U.S. PATENT DOCUMENTS

| | | | |
|---|---|---|---|
| 4,926,322 A | * 5/1990 | Stimac et al. ................. 703/23 |
| 5,623,621 A | 4/1997 | Garde ......................... 711/220 |
| 5,687,395 A | 11/1997 | Spencer ....................... 710/52 |
| 5,924,114 A | * 7/1999 | Maruyama et al. .......... 711/110 |
| 6,134,607 A | 10/2000 | Frink .......................... 710/22 |
| 6,314,478 B1 | * 11/2001 | Etcheverry ................... 710/29 |
| 6,363,470 B1 | * 3/2002 | Laurenti et al. ............. 711/220 |

FOREIGN PATENT DOCUMENTS

| | | |
|---|---|---|
| EP | 0859311 | 8/1998 |
| EP | 0933926 | 8/1999 |
| EP | 1014648 | 6/2000 |
| EP | 1085719 | 3/2001 |
| JP | 2001005636 | 1/2001 |
| WO | 01/11831 | 2/2001 |

* cited by examiner

Primary Examiner—Jeffrey Gaffin
Assistant Examiner—Harold Kim
(74) Attorney, Agent, or Firm—Thompson Hine LLP

(57) ABSTRACT

A method of transferring a block of data from a first to a second circular buffer of a computer system. The method comprises notifying the DMA controller of the source and destination addresses for the transfer, the sizes of the circular buffers, and the size of the data block to be transferred. At the DMA controller, respective base and rollover addresses of the circular buffers are identified. Data is read from the first circular buffer starting at the source address, continuing until the rollover address is reached, and continuing from said buffer base address until the end of the block is reached. Data is written to the second circular buffer starting at the destination address, continuing until the rollover address is reached, and continuing from said buffer base address until the end of the block is reached.

12 Claims, 4 Drawing Sheets

| Buffer Size | Size of Buffer | Rollover Address bits cleared |
|---|---|---|
| 000 | 1k | Lower 11 bits |
| 001 | 2k | Lower 12 bits |
| 010 | 4k | Lower 13 bits |
| 011 | 8k | Lower 14 bits |
| 100 | 16k | Lower 15 bits |
| 101 | 32k | Lower 16 bits |
| 110 | 64k | Lower 17 bits |
| 111 | 128k | Lower 18 bits |

DMA1 *Source Address Register*

| 31:6 | 5 | 4:2 | 1 | 0 |
|---|---|---|---|---|
| Source address | / - | Buffer size | rollover | Unused |

DMA1 *Destination Address Register*

| 31:6 | 5 | 4:2 | 1 | 0 |
|---|---|---|---|---|
| Destination address | / - | Buffer size | rollover | Unused |

Figure 6

DIRECT MEMORY ACCESS CONTROLLER FOR CIRCULAR BUFFERS

This Application claims priority to British Patent Application No. 0102173.2 filed on Jan. 27, 2001.

FIELD OF THE INVENTION

The present invention relates to a direct memory access controller for accessing circular buffers of memory in a computer system and to a method of operating a computer system comprising such a direct memory access controller.

BACKGROUND TO THE INVENTION

Conventional computer systems have been based around the combination of a processor (typically a microprocessor) and internal or external memory. In order to reduce the load on the microprocessor, so-called direct memory access (DMA) controllers have been introduced. These are typically integrated onto the same chip as the processor.

DMAs comprise hard-wired logic for performing memory access operations. A computer system architecture comprising a DMA controller 1 is illustrated in FIG. 1. Typically, in order to perform an access operation for a block of data, a microprocessor 2 stores in respective registers: the start (or "source") address of the memory block from which the data is to be transferred; the start (or "destination") address of the block of memory to which the data is to be transferred; and the size of the data block to be transferred. Typically, one of the source and destination locations is on a memory 3 located on the same chip as the processor and DMA controller, with the other of the source and destination locations being on an external memory 4. However, one or both of the locations may be a processor register or an external memory mapped device.

Queuing systems and data buffers are often implemented in memory as circular buffers in order to make efficient use of memory. A circular buffer occupying 16 bytes of memory space is illustrated in FIG. 2. A data sequence in a circular buffer may be wrapped around from the top of the buffer to its start.

Performing a DMA access to a circular buffer remains processor intensive, in that the microprocessor must calculate whether or not the top of the buffer will be reached during any given access operation, i.e. the block size remaining to be accessed by the DMA will not have decremented to 1 by the time that the top of wrap around (or rollover) condition is reached. Considering the 16 byte circular buffer of FIG. 1, assume that the microprocessor wishes to access a data block which is 10 bytes long, and that the starting point from the transfer is memory address 9. The microprocessor performs a check, prior to instructing the DMA controller to perform the access, to see if the rollover condition will occur during the access. As a rollover will occur, the microprocessor must split the DMA access into two consecutive transfers. During the first access, the DMA controller's registers will be set to:

| Source address: | 9 |
|---|---|
| Transfer size: | 7. |

This causes the seven bytes indicated in FIG. 2 to be accessed. In the second access, the DMA controller's registers will be set to:

| Source address: | 0 |
|---|---|
| Transfer size: | 3. |

This causes the three bytes indicated in FIG. 3 to be accessed.

In order to detect that a rollover condition will occur, the microprocessor incurs additional processing overheads. Additional processing overheads also arise from having to compute two source addresses, two destination addresses, and two transfer block sizes.

SUMMARY OF THE PRESENT INVENTION

It is an object of the present invention to overcome the above noted disadvantages of known computer systems. This and other objects are achieved by sending from the microprocessor to the DMA controller a value identifying the size of the circular buffer.

According to a first aspect of the present invention there is provided a method of accessing a circular buffer within a memory of a computer system comprising a processor and a direct memory access (DMA) controller, the method comprising:

notifying the DMA controller of the address of the start of a block of memory to be accessed, the size of the memory block, and the size of the circular buffer;

at the DMA controller, identifying a base address and a rollover address of the circular buffer; and accessing the circular buffer starting at the start address, continuing until the rollover address is reached, and continuing the access from said buffer base address until the end of the block is reached.

Embodiments of the present invention require a processor to transfer only a single transfer instruction to the DMA controller for each circular buffer access. Moreover, the task of computing the rollover address and (optionally) the base address of the buffer is transferred from the processor to the DMA controller. The circular buffer accessed may be a source buffer or a destination buffer for a data transfer.

Preferably, the start address of the block to be accessed is written to a dedicated register of the DMA controller by the processor. The circular buffer size may also be written to this same register.

Preferably, a value representing the circular buffer size is transferred from the processor to the DMA controller. This value may identify a unique one of a set of buffer sizes. For example, a set of eight buffer sizes may be uniquely identified by a three bit value.

More preferably, the base address of each of the circular buffers in use is specified as being located on a power of 2 boundary, or a predefined distance from a power of 2 boundary. This architecture allows the base address of a circular buffer to be determined using certain of the most significant bits of a source/destination address associated with an access request to that buffer, and setting the remaining least significant bits to 0. The number of bits set to zero corresponds to the size of the circular buffer.

According to a second aspect of the present invention there is provided a method of transferring a block of data from a first to a second circular buffer of a computer system comprising a processor and a direct memory access (DMA) controller, the method comprising:

notifying the DMA controller of the source and destination addresses for the transfer in the first and second buffers respectively, the sizes of the circular buffers, and the size of the data block to be transferred;

at the DMA controller, identifying respective base and rollover addresses of the circular buffers; and reading data from the first circular buffer starting at the source address, continuing until the rollover address is reached, and continuing from said buffer base address until the end of the block is reached; and writing data to the second circular buffer starting at the destination address, continuing until the rollover address is reached, and continuing from said buffer base address until the end of the block is reached.

It will be appreciated that the steps of reading and writing may be carried out simultaneously, reading one word from the first buffer and writing that word to the second buffer, before reading the next word from the first buffer. Alternatively, data may be read and written in sub-blocks, or as an entire block.

According to a third aspect of the present invention there is provided a direct memory access (DMA) controller for accessing a circular buffer within a memory of a computer system, the DMA controller comprising:

input means for receiving from a processor an instruction to access a block of a circular buffer;

a first register for receiving a start address within said buffer and a value defining the size of the circular buffer;

a second register for receiving a value defining the size of a block of the circular buffer to be accessed;

means for identifying a base address and a rollover address of the circular buffer; and means for accessing the circular buffer starting at the start address, continuing until the rollover address is reached, and continuing the access from said buffer base address until the end of the block is reached.

According to a fourth aspect of the present invention there is provided a direct memory access (DMA) controller for transferring a block of data from a first to a second circular buffer of a computer system, the DMA controller comprising:

a first register for receiving a source address within said first buffer and a value defining the size of the first circular buffer;

a second register for receiving a destination address within said second buffer and a value defining the size of the second circular buffer;

a third register for receiving a value defining the size of the data block to be transferred;

means for identifying respective base and rollover addresses of the circular buffers; and means for reading data from the first circular buffer starting at the source address, continuing until the rollover address is reached, and continuing from said buffer base address until the end of the block is reached, and writing data to the second circular buffer starting at the destination address, continuing until the rollover address is reached, and continuing from said buffer base address until the end of the block is reached.

According to a fifth aspect of the present invention there is provided a computer system comprising:

a processor;

a DMA controller according to the third or fourth aspects of the present invention;

a memory; and address and data buses interconnecting the processor, DMA controller, and memory.

BRIEF DESCRIPTION OF THE DRAWINGS

FIG. 6 illustrates the contents of source and destination address buffers.

DETAILED DESCRIPTION OF CERTAIN EMBODIMENTS

Figure 1:
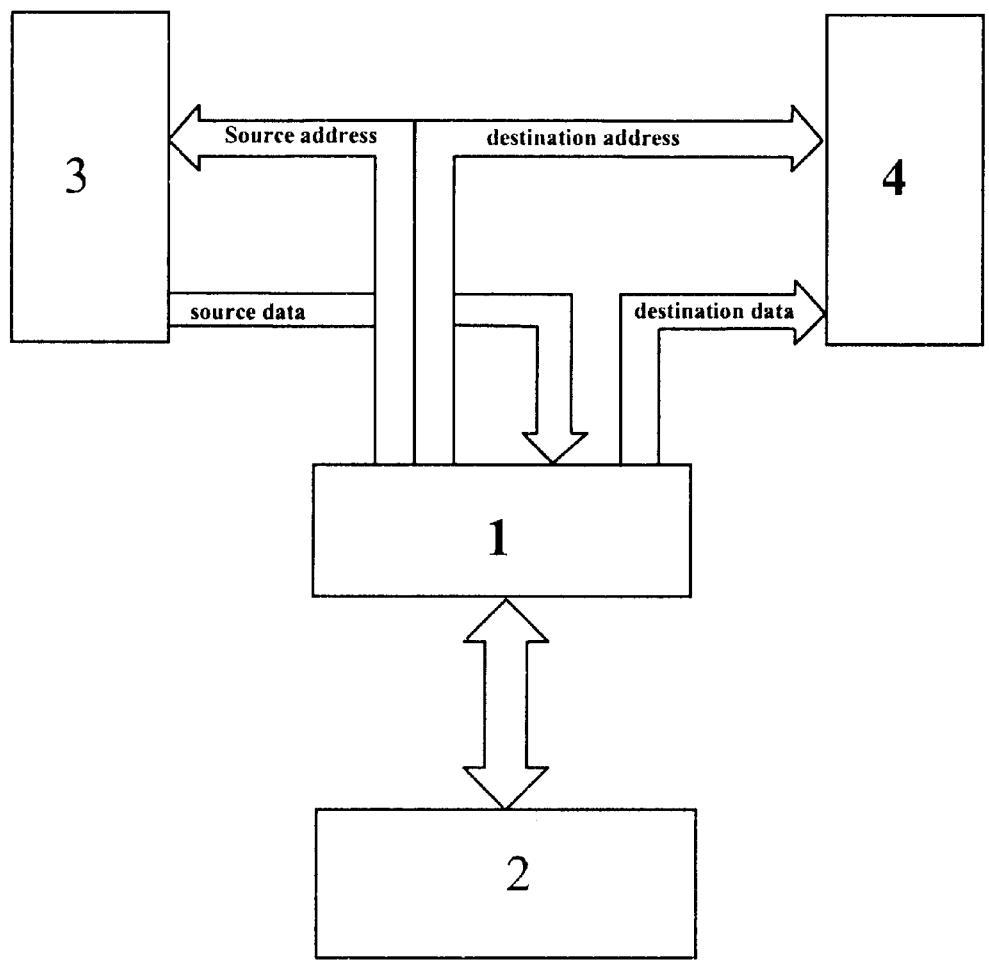
FIG. 1 illustrates schematically a computer system architecture comprising a DMA controller.
Figure 2:
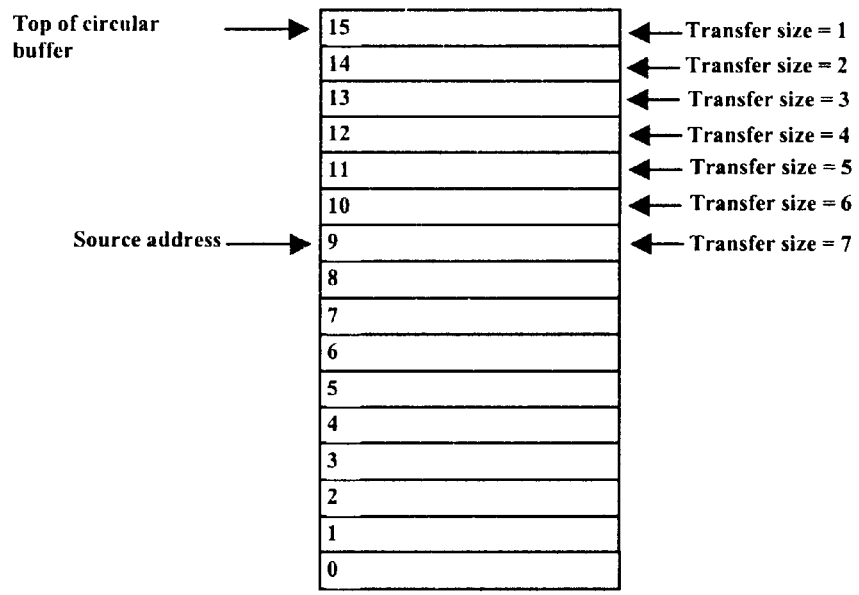
FIG. 2 illustrates schematically a circular buffer, with the positions of a first DMA transfer block indicated.
Figure 3:
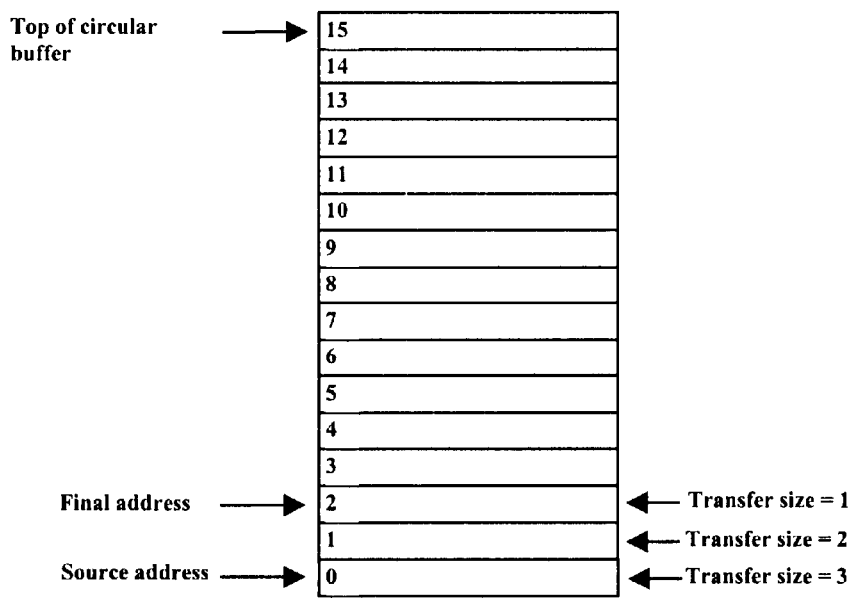
FIG. 3 illustrates schematically the circular buffer of FIG. 2, with the positions of a second DMA transfer block indicated.

A computer system using a direct memory access (DMA) controller to access a circular buffer has been described with reference to FIGS. 1 to 3. There will now be described a new method of operating a DMA controller. This requires that the processor write a number of extra fields to the source and destination address registers of the DMA. A first of these fields is a ROLLOVER ENABLE field which has a length of 1-bit. This acts as a flag to identify whether or not this feature is enabled for the memory access operation in question (i.e. to identify whether the memory access relates to a circular buffer or to a linear block of memory). It is noted that the rollover feature may be enabled for one of the source and destination registers but not for the other, or for both. The following discussion assumes the latter.

A second new field defines the size of the source/destination buffer. In a first embodiment of the invention, the second field is wide enough to define the buffer size in binary form. Thus for example an 18 bit wide field would be required if the maximum buffer size were 128 k bytes. A third field, which is also written into the register by the processor, is required to specify the base address of the circular buffer in question.

The processor then writes the size of the data block to be transferred into the transfer register. A start flag of this register is also set to 1, in order to trigger the DMA controller to commence the transfer. The DMA controller calculates the number of bytes which can be accessed (read or written) from each circular buffer before the top of the buffer is reached, as well as the number of bytes which must be accessed from the bottom of each buffer once rollover occurs.

In order to reduce the size of the field required to specify the buffer length, the set of possible buffer sizes may be coded using a fixed length code. For example, a 3-bit code could be used to identify one of the following eight buffer sizes; 1 k, 2 k, 4 k, 8 k, 16 k, 32 k, 64 k, 128 k. A third field may again be included to specify the base address of the circular buffer.

Figures 4, 5:
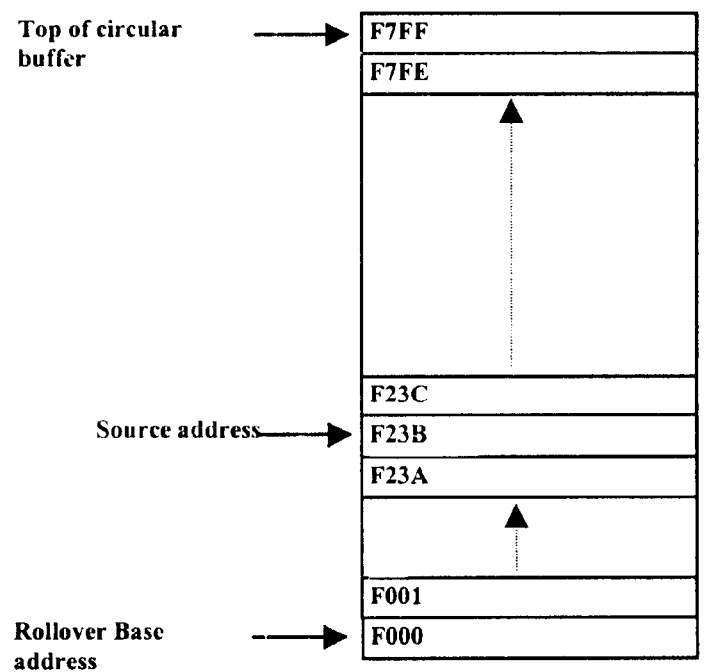
FIG. 4 is a table illustrating a mechanism for calculating a base address of a circular buffer.
FIG. 5 illustrates schematically a rollover scenario in a circular buffer.

It has been recognised however, that if the base addresses of the in-use buffers correspond to power of 2 boundaries within the mapped address space, a simple mechanism can be used to determine the base address from the source or destination address. This involves setting a number of the least significant bits (lsb) of the source/destination address to 0, which number corresponds to the size of the circular buffer. FIG. 4 shows a table in which the first column contains the 3-bit codes identifying whilst the second column shows the buffer sizes mapped to the three bit codes. The third column shows the number of lsb's which are set to 0 for each buffer size.

To give an example, consider that the DMA registers are configured as follows (using hexadecimal notation for the source and destination addresses and assuming that):

| Source address: | F23B | Buffer size: | 001 (2k) |
|---|---|---|---|
| Dest. address: | 6310 | Buffer size: | 001 (2k) |

When the rollover condition occurs (from FIG. 4) the lower 12 bits of the source and destination addresses will be set to 0, i.e.

| Base source address: | F000 |
|---|---|
| Base dest. address: | 6000. |

FIG. 5 is a pictorial representation of the source address rolling over in the circular buffer.

FIG. 6 illustrates the contents of the source and destination address registers resulting from the method described above. The registers are 32-bit registers, and contain a 26 bit address, a three bit field identifying the buffer size, a rollover (on/off) bit, and one unused bit. The registers also include a bit (+/−) which indicates whether the buffer is to be accessed incrementally or decrementally.

It will be appreciated by the person of skill in the art that various modifications may be made to the above described embodiments without departing from the scope of the present invention.

What is claimed is:

1. A method of accessing a circular buffer within a memory of a computer system comprising a processor and a direct memory access (DMA) controller, the method comprising:
   notifying the DMA controller of the address of the start of a block of memory to be accessed, the size of the memory block, and the size of the circular buffer;
   at the DMA controller, identifying a base address and a rollover address of the circular buffer; and
   accessing the circular buffer starting at the start address, continuing until the rollover address is reached, and continuing the access from said buffer base address until the end of the block is reached.

2. A method according to claim 1, wherein said circular buffer is a source buffer or a destination buffer for a data transfer operation.

3. A method according to claim 1, wherein the start address of the block to be accessed is written to a dedicated register of the DMA controller by the processor and the circular buffer size is also be written to this same register.

4. A method according to claim 1 and comprising transferring a value representing the circular buffer size from the processor to the DMA controller.

5. A method according to claim 4, wherein said value identifies a unique one of a set of buffer sizes.

6. A method according to claim 5, wherein the base address of each of the circular buffers in use is specified as being located on a power of 2 boundary, or a predefined distance from a power of 2 boundary, whereby the base address of said circular buffer can be determined using the start address.

7. A method according to claim 6 and comprising determining the base address of the circular buffer by setting a number of the least significant bits of the start address to 0, that number corresponding to the size of the circular buffer.

8. A method of transferring a block of data from a first to a second circular buffer of a computer system comprising a processor and a direct memory access (DMA) controller, the method comprising:
   notifying the DMA controller of the source and destination addresses for the transfer in the first and second buffers respectively, the sizes of the circular buffers, and the size of the data block to be transferred;
   at the DMA controller, identifying respective base and rollover addresses of the circular buffers; and
   reading data from the first circular buffer starting at the source address, continuing until the rollover address is reached, and continuing from said buffer base address until the end of the block is reached; and
   writing data to the second circular buffer starting at the destination address, continuing until the rollover address is reached, and continuing from said buffer base address until the end of the block is reached.

9. A direct memory access (DMA) controller for accessing a circular buffer within a memory of a computer system, the DMA controller comprising:
   input means for receiving from a processor an instruction to access a block of a circular buffer;
   a first register for receiving a start address within said buffer and a value defining the size of the circular buffer;
   a second register for receiving a value defining the size of a block of the circular buffer to be accessed;
   means for identifying a base address and a rollover address of the circular buffer; and
   means for accessing the circular buffer starting at the start address, continuing until the rollover address is reached, and continuing the access from said buffer base address until the end of the block is reached.

10. A direct memory access (DMA) controller for transferring a block of data from a first to a second circular buffer of a computer system, the DMA controller comprising:
   a first register for receiving a source address within said first buffer and a value defining the size of the first circular buffer;
   a second register for receiving a destination address within said second buffer and a value defining the size of the second circular buffer;
   a third register for receiving a value defining the size of the data block to be transferred;
   means for identifying respective base and rollover addresses of the circular buffers; and
   means for reading data from the first circular buffer starting at the source address, continuing until the rollover address is reached, and continuing from said buffer base address until the end of the block is reached, and writing data to the second circular buffer starting at the destination address, continuing until the rollover address is reached, and continuing from said buffer base address until the end of the block is reached.

11. A computer system comprising:
   a processor;
   a direct memory access (DMA) controller for transferring a block of data from a first to a second circular buffer of a computer system, the DMA controller comprising:
   a first register for receiving a source address within said first buffer and a value defining the size of the first circular buffer;
   a second register for receiving a destination address within said second buffer and a value defining the size of the second circular buffer;

a third register for receiving a value defining the size of the data block to be transferred;

means for identifying respective base and rollover addresses of the circular buffers; and means for reading data from the first circular buffer starting at the source address, continuing until the rollover address is reached, and continuing from said buffer base address until the end of the block is reached, and writing data to the second circular buffer starting at the destination address, continuing until the rollover address is reached, and continuing from said buffer base address until the end of the block is reached;

a memory; and address and data buses interconnecting the processor, DMA controller, and memory.

12. A computer system comprising:

a processor;

a direct memory access (DMA) controller for accessing a circular buffer within a memory of a computer system, the DMA controller comprising:

input means for receiving from a processor an instruction to access a block of a circular buffer;

a first register for receiving a start address within said buffer and a value defining the size of the circular buffer;

a second register for receiving a value defining the size of a block of the circular buffer to be accessed;

means for identifying a base address and a rollover address of the circular buffer; and means for accessing the circular buffer starting at the start address, continuing until the rollover address is reached, and continuing the access from said buffer base address until the end of the block is reached;

a memory; and address and data buses interconnecting the processor, DMA controller, and memory.

* * * * *